United States Patent
Jäger et al.

(10) Patent No.: US 9,719,833 B2
(45) Date of Patent: Aug. 1, 2017

(54) REFERENTIAL ULTRASONIC TRANSCEIVER FOR ACOUSTIC MEASUREMENT OF A FLUID LEVEL

(71) Applicants: Wighard Jäger, Spardorf (DE); Karl-Friedrich Pfeiffer, Erlangen (DE)

(72) Inventors: Wighard Jäger, Spardorf (DE); Karl-Friedrich Pfeiffer, Erlangen (DE)

(73) Assignee: Continental Automotive GmbH, Hannover (DE)

( * ) Notice: Subject to any disclaimer, the term of this patent is extended or adjusted under 35 U.S.C. 154(b) by 259 days.

(21) Appl. No.: 14/370,150

(22) PCT Filed: Dec. 20, 2012

(86) PCT No.: PCT/EP2012/076513
§ 371 (c)(1),
(2) Date: Jul. 1, 2014

(87) PCT Pub. No.: WO2013/102580
PCT Pub. Date: Jul. 11, 2013

(65) Prior Publication Data
US 2014/0345377 A1    Nov. 27, 2014

(30) Foreign Application Priority Data

Jan. 5, 2012 (DE) .......... 10 2012 200 122
Apr. 5, 2012 (DE) .......... 10 2012 205 640

(51) Int. Cl.
*G01F 23/296* (2006.01)
*G01F 25/00* (2006.01)

(52) U.S. Cl.
CPC ........ *G01F 23/296* (2013.01); *G01F 23/2962* (2013.01); *G01F 25/0061* (2013.01)

(58) Field of Classification Search
CPC ............... G01F 23/296; G01F 23/2961; G01F 23/2962; G01F 25/0061
(Continued)

(56) References Cited

U.S. PATENT DOCUMENTS 4,862,748 A * 9/1989 Woodmansee ....... G01N 29/221
73/633
5,226,320 A * 7/1993 Dages ................. G01F 23/2962
181/124

(Continued)

FOREIGN PATENT DOCUMENTS

CN   101636666   1/2010
DE   3706453    9/1988
(Continued)

OTHER PUBLICATIONS

Translation SU 1721444 Brovtsyn, Gadzhiev & Filatov.*

*Primary Examiner* — Natalie Huls
*Assistant Examiner* — Monica S Young
(74) *Attorney, Agent, or Firm* — Cozen O'Connor

(57) ABSTRACT

A filling level transmitter for measuring a filing level of a liquid includes: a filling level sensor having: an ultrasonic transceiver configured to emit ultrasound, and sensor electronics; a sound-conducting tube having two reflectors spaced apart from one another, the first reflector being configured to deflect ultrasound emitted by the transceiver in the direction of the second reflector, and the second reflector being configured to deflect the emitted ultrasound in the direction of the surface of the liquid. A third reflector is arranged in the second reflector such that emitted ultrasound impacting the third reflector is reflected in the direction of the first reflector.

9 Claims, 1 Drawing Sheet

(58) Field of Classification Search
USPC .......................................................... 73/290
See application file for complete search history.

(56) References Cited

U.S. PATENT DOCUMENTS

| | | | |
|---|---|---|---|
| 5,437,194 A | 8/1995 | Lynnworth | |
| 5,471,872 A * | 12/1995 | Cummings | ......... G01F 23/2962 |
| | | | 73/290 V |
| 5,650,572 A * | 7/1997 | Vontz | ...................... G01F 1/662 |
| | | | 73/861.27 |
| 6,536,275 B1 * | 3/2003 | Durkee | ............... G01F 23/2962 |
| | | | 73/290 R |
| 8,015,866 B2 * | 9/2011 | Aoki | ........................ B41J 2/175 |
| | | | 73/149 |
| 2004/0007061 A1 | 1/2004 | Forgue | |
| 2005/0284217 A1 * | 12/2005 | Miyagawa | .......... G01F 23/2962 |
| | | | 73/290 V |
| 2009/0038394 A1 * | 2/2009 | Zachmann | .......... G01F 23/2962 |
| | | | 73/290 V |
| 2009/0074222 A1 * | 3/2009 | Song | .................... H04R 19/016 |
| | | | 381/357 |
| 2014/0107492 A1 * | 4/2014 | Zhou | .................... G10K 11/357 |
| | | | 600/467 |

FOREIGN PATENT DOCUMENTS

| | | |
|---|---|---|
| GB | 997481 | 7/1965 |
| JP | 11-153471 | 6/1999 |
| JP | 2004-294073 A | 10/2004 |
| JP | 2004-347378 | 12/2004 |
| SU | 1721444 A1 * | 3/1992 |
| WO | WO 2008/101339 A1 | 8/2008 |
| WO | WO 2009/074428 A1 | 6/2009 |

* cited by examiner

REFERENTIAL ULTRASONIC TRANSCEIVER FOR ACOUSTIC MEASUREMENT OF A FLUID LEVEL

CROSS-REFERENCE TO RELATED APPLICATIONS

This is a U.S. national stage of application No. PCT/EP2012/076513, filed on 20 Dec. 2012, which claims priority to the German Application No. 10 2012 200 122.0, filed 5 Jan. 2012, and German Application No. 10 2012 205 640.8, filed 5 Apr. 2012, the content of all are incorporated herein by reference.

BACKGROUND OF THE INVENTION

1. Field of the Invention

The invention relates to a filling level transmitter having a sound-conducting tube and a filling level sensor with an ultrasonic transceiver and sensor electronics.

2. Related Art

Such filling level transmitters with an ultrasonic transceiver that generates and outputs ultrasonic waves and receives reflected ultrasonic waves are used, for example, to measure filling levels in fuel containers of motor vehicles and are therefore known.

When determining a filling level by ultrasound, in the first instance the variable measurement signal is problematical owing solely to changing measurement conditions such as, for example, the temperature or the measurement medium. For this purpose it is known to provide a reference measurement at a reference reflector in order to eliminate influence of changed measurement conditions. Owing to assembly tolerances, calibration must be carried out before the filling level transmitter is put into service. In addition, the reference measured section with the reference reflector is arranged in the vicinity of the actual measured section for the filling level and therefore separately, as a result of which additional installation space is required. On the other hand, an ultrasonic transceiver has, owing to the principle, a dead section that lies directly in front of the transceiver and in which reliable measurement is not possible. This dead section is produced as a result of the fact that the sound pulse which is emitted generates a certain amount of reverberation in the transceiver, which has to largely decay before an echo signal can be detected cleanly.

SUMMARY OF THE INVENTION

It is therefore an object of the invention to provide a filling level transmitter that both operates reliably in the case of changing conditions of use, compensates for inadequacies due to the measuring principle and at the same time is of simple and space-saving design.

This object is achieved in that the sound-conducting tube has two reflectors arranged spaced apart from one another, wherein the first reflector is designed to deflect the ultrasound in the direction of the second reflector, and the second reflector is designed to deflect the ultrasound in the direction of the surface of the liquid, and in that in the second reflector a third reflector is arranged that reflects the ultrasound in the direction of the first reflector.

With the arrangement of the third reflector as a measuring reflector for the reference measured section in the second reflector, the reference measured section is integrated into the actual measured section for the filling level, as a result of which installation space is saved.

This arrangement definitively rules out the possibility of the actual filling level measurement being influenced since the reference echo is detected by the transceiver in all cases before the actual level echo.

In addition, the reference measured section can be set according to requirements by the selection of the distance between the first and second reflectors. This is advantageous insofar as long, in the case of relatively reference sections, the relative error during the reference determination owing to fabrication tolerances and the final time resolution of the transceiver is smaller than in the case of relatively short reference sections, which is important insofar as the filling level that is determined always has at least the same relative error as the reference measured section.

In addition, as a result of the double deflection the second reflector can be arranged relatively close to the floor of the fuel container, with the result that even very small filling levels can be measured. At the same time, influencing of the minimum measurable filling level is ruled out by the dead section, owing to the principle, in that owing to the double deflection the second reflector is only arranged after this dead section.

In a first advantageous embodiment, the first and the second reflectors are arranged such that they deflect the ultrasound by 90° in each case. Particularly low filling levels can be measured if the measured section between these two reflectors runs approximately parallel to the floor of the fuel container. However, different beam profiles are also conceivable, in particular adapted to the container shape or container installations.

The reflectors can be manufactured and mounted particularly easily if the first and second reflectors are formed by one wall of the beam-conducting tube in each case. If the sound-conducting tube only extends as far as the second reflector, a particularly space-saving filling level transmitter is obtained.

In order to ensure a sufficiently good measurement signal for the filling level despite the space-saving arrangement, the third reflector has a surface area which is less than 40%, preferably 20% to 5% of the surface area of the second reflector.

In one advantageous embodiment, the third reflector is connected as a separate component to the second reflector. This design permits the separate manufacture of the measuring reflector.

The need to mount the third reflector is avoided if the latter is embodied in one piece with the second reflector. It is therefore conceivable to form the third reflector by shaping, such as stamping or punching in the second reflector.

A separate arrangement of the beam-conducting tube in the fuel container is avoided if the beam-conducting tube forms one structural unit with the filling level transmitter. The advantage is that the unit can already be preassembled and tested before it is installed in the fuel container.

The reliable filling of the beam-conducting tube with fuel is ensured if the beam-conducting tube has at least one opening in its lateral walls, preferably in the lower region.

BRIEF DESCRIPTION OF THE DRAWINGS

The invention will be explained in more detail with reference to an exemplary embodiment. In the drawings.

DETAILED DESCRIPTION OF THE PRESENTLY PREFERRED EMBODIMENTS

Figure 1:
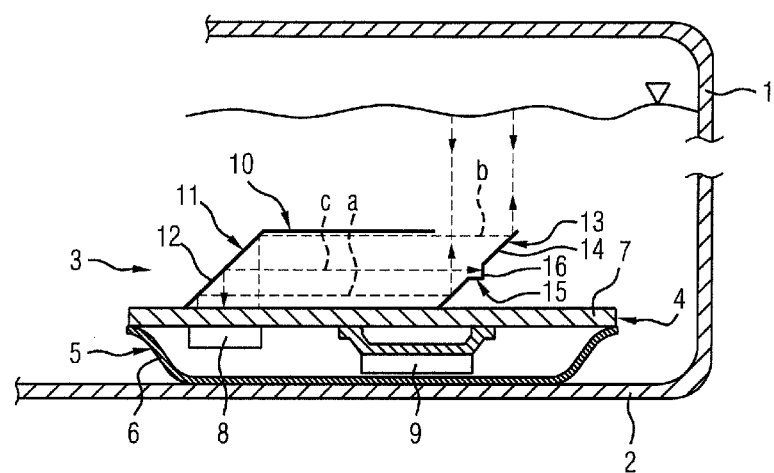
FIG. 1 shows a fuel level transmitter according to the invention in section.

In FIG. 1, a filling level transmitter 3 is arranged on the floor in the fuel container 1. The filling level transmitter 3 is composed of a filling level sensor 4 with a housing 5. The housing 5 is composed of a metal lid 6 soldered onto a ceramic substrate 7 that is used as a printed circuit board, with the result that the ceramic substrate 7 forms the floor of the housing 1. An ultrasonic transceiver 8 and sensor electronics 9 for evaluating the signals and making available an electrical signal that corresponds to the filling level to be passed on to a display device for the filling level are arranged on the ceramic substrate 7.

A sound-conducting tube 10 is attached to the ceramic substrate 7. The sound-conducting tube 10 has a side wall 11, which forms a first reflector 12. The first reflector 12 deflects the ultrasound emitted by the transceiver 8 through 90°, with the result that the ultrasound propagates parallel to the floor 2 of the fuel container 1. The ultrasonic waves are illustrated by individual lines a, b, c. A further side wall 13 of the sound-conducting tube 10 forms a second reflector 14 that deflects the ultrasound through 90° in the direction of the surface of the liquid. The side wall has an indent 15 in the center of the second reflector 14, which indent 15 forms a third reflector 16 that acts as a measuring reflector. The surface area of the third reflector 16 is only 5% of the surface area of the second reflector 14 here. The third reflector is embodied such that it reflects incident ultrasonic waves (line c) in the opposite direction onto the first reflector 12, with the result that the ultrasonic waves are directed back to the transceiver 8. The section from the transceiver 8 to the third reflector 16 therefore forms the reference measured section.

Figure 2:
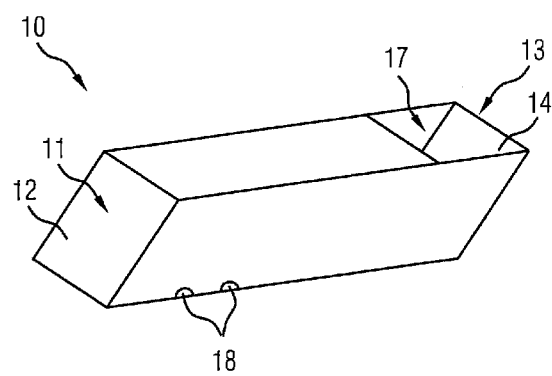
FIG. 2 shows a perspective illustration of the beam-conducting tube.

FIG. 2 shows the sound-conducting tube 10 of the filling level transmitter 3. The sound-conducting tube 10 is formed by four side walls, wherein two side walls 11, 13 are the reflectors. An opening 17 on the upper side in the region of the second reflector 14 permits an unimpeded passage of the ultrasonic waves in the direction of the surface of the liquid. In an analogous fashion to this, such an opening is also arranged on the first reflector 12. Lateral openings 18 in the sound-conducting tube 10 permit fuel to penetrate into the sound-conducting tube 10.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level transmitter for measuring a filling level of a liquid, the filling level transmitter comprising:
   a filling level sensor having:
      an ultrasonic transceiver configured to emit ultrasound, and
      sensor electronics;
   a sound-conducting tube having:
      a first side wall forming a first reflector;
      a second side wall forming a second reflector,
   the second reflector being arranged spaced apart from and parallel to the first reflector, wherein the first reflector is configured to deflect ultrasound emitted by the transceiver in the direction of the second reflector, and the second reflector is configured to deflect the emitted ultrasound reflected off of the first reflector in the direction of the surface of the liquid, the second reflector receiving and reflecting back to the first reflector ultrasound reflected off of the surface of the liquid; and an indent formed in the center of the second reflector, the indent forming a third reflector arranged in the second reflector such that emitted ultrasound impacting the third reflector is reflected in the direction of the first reflector wherein the sound-conducting tube is in the form of a parallelepiped.

2. The filling level transmitter as claimed in claim 1, wherein the first and the second reflectors each deflect the emitted ultrasound by 90°.

3. The filling level transmitter as claimed in claim 1, wherein the third reflector has a surface that is less than 40% of the surface of the second reflector.

4. The filling level transmitter as claimed in claim 3, wherein the third reflector is integral with the second reflector.

5. The filling level transmitter as claimed in claim 3, wherein the third reflector has a surface that is 20% to 5% of the surface of the second reflector.

6. The filling level transmitter as claimed in claim 1, wherein the sound-conducting tube forms one structural unit with the filling level sensor.

7. The filling level transmitter as claimed in claim 1, wherein the sound-conducting tube has at least one opening in its lateral walls.

8. The filling level transmitter as claimed in claim 7, wherein the at least one opening is in the lower region of the lateral walls of the sound-conducting tube.

9. The filling level transmitter as claimed in claim 1, wherein the filling level sensor further comprises:
   a housing having a metal lid; and
   a ceramic substrate comprising a printed circuit board, the metal lid being soldered onto the ceramic substrate,
   wherein the ceramic substrate is attached to the sound-conducting tube and the ultrasonic transceiver and the sensor electronics are arranged on the ceramic substrate.

* * * * *